United States Patent [19]
Tomida et al.

[11] Patent Number: 6,109,414
[45] Date of Patent: Aug. 29, 2000

[54] SHIFT LEVER DEVICE

[75] Inventors: Shigetoshi Tomida; Yoshihiro Kawai, both of Aichi-ken; Takehiro Kuroda, Kanagawa-ken; Yasuhiko Itoh, Tokyo, all of Japan

[73] Assignee: Kabushiki Kaisha Tokai-Rika-Denki -Seisakusho, Aichi-ken, Japan

[21] Appl. No.: 09/217,253

[22] Filed: Dec. 21, 1998

[30] Foreign Application Priority Data

Dec. 25, 1997 [JP] Japan ................................ 9-356744

[51] Int. Cl.$^7$ .................................................. B60K 41/28
[52] U.S. Cl. ...................... 192/220.7; 74/483 R; 477/96
[58] Field of Search ..................... 74/483 R; 192/220.7; 477/96

[56] References Cited

U.S. PATENT DOCUMENTS

| | | | |
|---|---|---|---|
| 4,930,609 | 6/1990 | Bois et al. | 190/220.7 |
| 4,947,967 | 8/1990 | Kito et al. | 477/96 |
| 5,025,901 | 6/1991 | Kito et al. | 192/220.7 |
| 5,314,049 | 5/1994 | Nordstrom | 477/96 |
| 5,402,870 | 4/1995 | Osborn | 192/220.7 |
| 5,435,424 | 7/1995 | Murakami et al. | 192/220.7 |
| 5,980,423 | 11/1999 | Suzuki et al. | 477/99 |

FOREIGN PATENT DOCUMENTS 10-119601   5/1998   Japan .

*Primary Examiner*—Allan D. Herrmann
*Attorney, Agent, or Firm*—Nixon Peabody LLP; Thomas W. Cole

[57] ABSTRACT

A shift lever device is provided that includes a shift lever, an interlocking member movable from a first position to a second position, a detent member that abuts the interlocking member at the first position and restricts the shifting operation if the shift lever is shifted from the parking range position to another range position, a restricting member movable between a shift-lock state and a shift-lock released state for allowing or preventing the interlocking member to move from the first position to the second position; a manual operation mechanism which allows the restricting member to be manually moved from the shift-locked state to the shift-lock released state, and an actuator connecting member that moves integrally with the restricting member due to the operation of an actuator. When the restricting member is placed in a shift-locked state, it can be moved by the manual operation mechanism into the shift-lock released state. The shift lever device thus allows the release of a shift lock by a manual operation, and is operable in a compact space.

16 Claims, 5 Drawing Sheets

SHIFT LEVER DEVICE

BACKGROUND OF THE INVENTION

1. Field of the Invention

The present invention relates to a shift lever device for shifting the transmission of a vehicle.

2. Description of the Related Art

In general, a shift lever device for shifting the automatic transmission of a vehicle has a structure in which the automatic transmission is shifted by shifting a shift lever in the longitudinal direction of the vehicle. In this type of shift lever device, the operating direction of the shift lever is the longitudinal direction of the vehicle. For example, when the shift lever is selected to be in a P shift range, the shift lever can be shifted to be in an R shift range by simply moving the shift lever in the rearward direction of the vehicle.

It should be noted that this type of shift lever device requires a shift lock mechanism which enables the shifting operation of the shift lever only under a specific condition, and the aforementioned shifting operation from the P shift range to the R shift range must be restricted to a certain method.

In this case, for example, a shift lever device has been proposed in which an electric type actuator such as a solenoid or the like or a shift controller is provided in the vicinity of the shift lever and, when the shift lever is operated from a P shift range to an R shift range, the actuator engages with the shift lever and the shifting operation to the R shift range is prevented unless a braking operation is effected.

In this type of shift lever device (shift lock mechanism), in a state in which the shift lever is disposed in the P shift range, a lock plate fixed by the electric type actuator engages with a grooved pin such that the movement thereof (the operation of a knob button) is prevented and that the shifting operation of the shift lever to a shift range other than the P shift range is prevented.

It should be noted that, in the conventional method, even if electricity does not flow to the solenoid due to electrical failure such as a dead battery or the like, the shift lever can be shifted when the key is turned on. However, when the lock plate does not rotate due to some kind of trouble, there is no way to release a shift lock forcibly.

SUMMARY OF THE INVENTION

With the aforementioned in view, an object of the present invention is to obtain a shift lever device in which a shift lock can be released forcibly by a manual operation even in a shift-locked state and a key-locked state, and in which a space for disposing another member for manually releasing the shift-locked state or the like is hardly restricted at all and the space can be used effectively.

The shift lever device of the present invention comprises: a shift lever for a gear changing operation of a transmission of a vehicle; an interlocking member which is provided at the shift lever and is attached so as to move from a first position to a second position by the operation of a knob button; a detent member provided with a detent portion which, when the shift lever is shifted, abuts the interlocking member at the first position and restricts the shifting operation if the shift lever is shifted from the parking range position to another range position, and the detent member separates from the interlocking member at the second position so that the shifting operation is effected freely; a restricting member which, when the shift lever is disposed at the parking range position, is attached so as to be able to move between a shift-lock released state which allows the interlocking member to move and a shift-locked state which does not allow the interlocking member to move from the first position to the second position; a manual operation mechanism which manually effects an operation of moving the restricting member from the shift-locked state to the shift-lock released state; and an actuator connecting member which is attached so as to move integrally with the restricting member due to the operation of an actuator, wherein when the restricting member is placed in a shift-locked state, the restricting member is moved relative to the actuator connecting member by operating the manual operation mechanism and can be moved to the shift-lock released state.

Due to the aforementioned structure, the restricting member which closes the detent portion is moved to the shift-lock released state by operating the manual operation mechanism, and at the parking range position, the interlocking member within the detent portion is removed from the detent portion which is at the parking range position, and the shift lever is moved from the parking shift position to another shift range. Accordingly, even in the shift-locked state in which the shift lever device is shift-locked and the movement of the interlocking member from the parking range position is restricted, the shift lever can be shifted by operating the manual operation mechanism. Moreover, when the interlocking member is disposed at the shift-locked position in which the movement of the interlocking member from the parking range position to another range position is restricted, unless the manual operation mechanism is operated, the interlocking member at the parking range position cannot be moved from the parking range position to another range position, and the shift lever device can be shift-locked in a state in which the shift lever cannot be moved from the parking shift position to another shift range. Further, when the restricting member and the actuator connecting member are formed adjacent to the detent member, the space for disposing this restricting member and the actuator connecting member and the movable space for releasing and moving the members can be used effectively.

Further, a shift lever device of the present invention comprises: a shift lever for a gear changing operation of a transmission of a vehicle; an interlocking member which is provided at the shift lever and is attached so as to be moved by the operation of a knob button; a detent member provided with a detent portion which, when the shift lever is shifted, abuts the interlocking member and restricts the shifting operation if the shift lever is at least shifted from the parking range position to another range position; a restricting member which is attached so as to be able to move between a shift-lock released state, in which the restricting member is disposed separately from an opening portion of the detent portion so that the interlocking member at the parking range position can be removed from the detent portion, and a shift-locked state, in which the restricting member is disposed so as to close the opening portion of the detent portion; a manual operation mechanism which manually moves the restricting member from the shift-locked state to the shift-lock released state; an actuator connecting member which is attached so as to move integrally with the restricting member due to the operation of an actuator; an engaging member which is engaged so that the actuator connecting member and the restricting member are integrally operated by the actuator and moved from the shift-locked state to the shift-lock released state; and a spring which is installed between the restricting member and the actuator connecting member and urges so as to operate the restricting member and the actuator connecting member integrally, and in the shift-locked state, the spring being attached so as to be elastically deformed when the restricting member is moved to the shift-lock released state by the manual operation mechanism.

Due to the aforementioned structure, the actuator connecting member operated by the actuator engages with the restricting member via the engaging member, and the actuator connecting member and the restricting member can be reliably moved from the shift-locked state to the shift-lock released state.

Further, even if the actuator connecting member is stopped at the shift-locked position by the actuator, the spring is elastically deformed and the restricting member, which has been manually operated by the manual operation mechanism, can be moved to a position in the shift-lock released state.

Moreover, because the engaging member and the spring which function as described above can be attached compactly between the restricting member and the actuator connecting member, the spaces for disposing or moving can be used effectively.

Further, a shift lever device of the present invention comprises: a shift lever for a gear changing operation of a transmission of a vehicle; an interlocking member which is provided at the shift lever and is attached so as to move from a first position to a second position by the operation of a knob button; a detent member provided with a detent portion which, when the shift lever is shifted, abuts the interlocking member at the first position and restricts the shifting operation if the shift lever is at least shifted from the parking range position to another range position; a restricting member which is attached so as to be able to move between a shift-lock released state, which allows the movement of the interlocking member at the first position, i.e., the parking range position to the second position, and a shift-locked state which prevents the movement of the interlocking member at the first position to the second position; a manual operation mechanism which manually moves the restricting member from the shift-locked state to the shift-lock released state; an actuator connecting member which is moved due to the operation of an actuator; an engaging means which is disposed between the actuator connecting member and the restricting member, the engaging means transmitting the movement of the actuator connecting member operated by the actuator to the restricting member and moving the restricting member to the shift-lock released state, and the engaging means separating the restricting member in a shift-locked state from the actuator connecting member so that the restricting member can be moved to the shift-lock released state by the manual operation mechanism; and a spring which urges the restricting member to the shift-locked state.

Due to the aforementioned structure, when the restricting member is operated by the actuator, the restricting member reliably moves to the shift-lock released state, and further, the restricting member is independent from the actuator connecting member and can be moved to the shift-lock released state. Accordingly, the restricting member can be moved to the shift-lock released state by the manual operation mechanism as well. Furthermore, the restricting member can be easily returned to the original shift-locked state by the spring.

DESCRIPTION OF THE PREFERRED EMBODIMENTS

Figure 1:
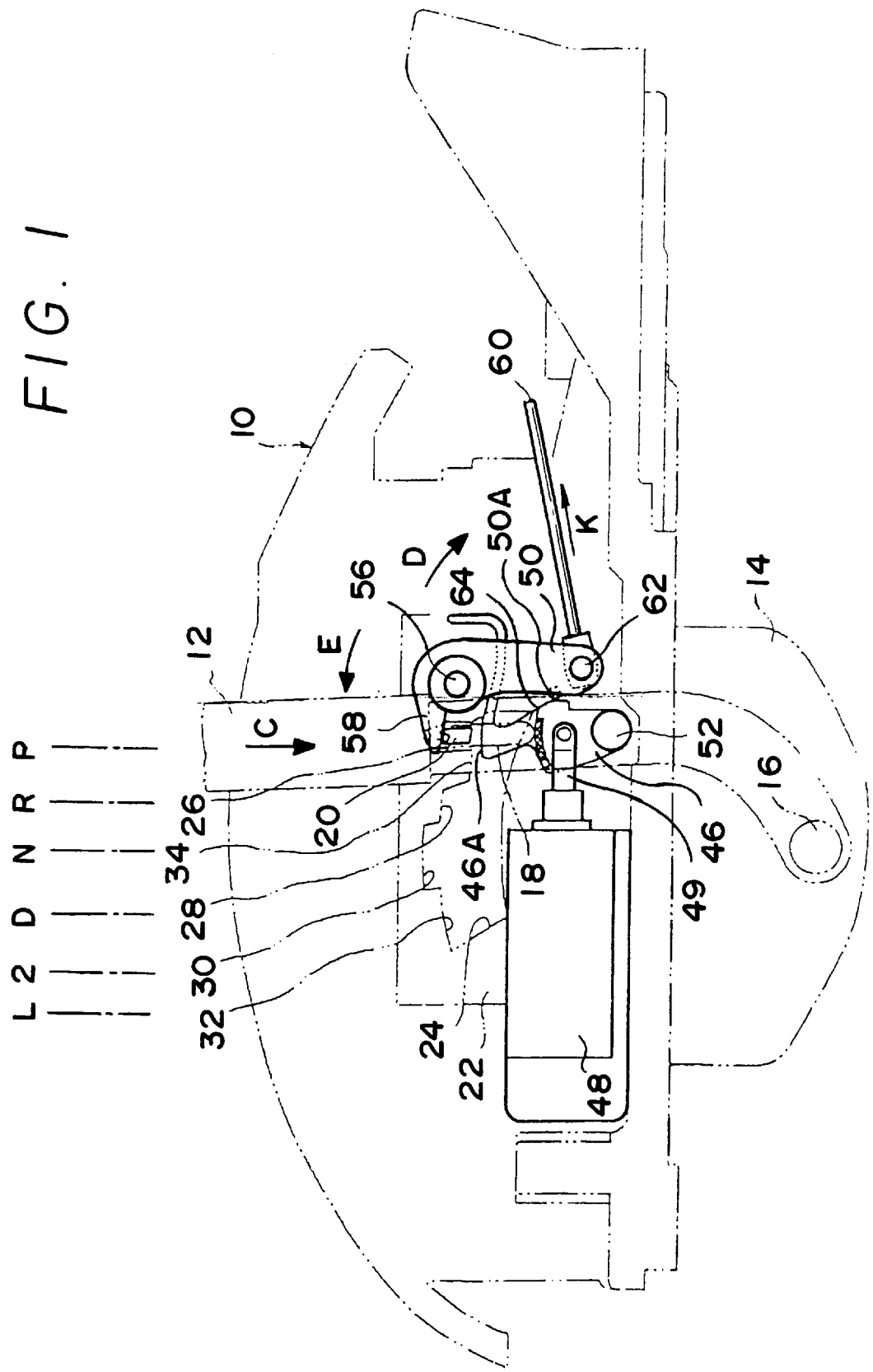
FIG. 1 is a schematic side view which shows the structure of a main portion of a shift lever device relating to a present embodiment.
Figure 2:
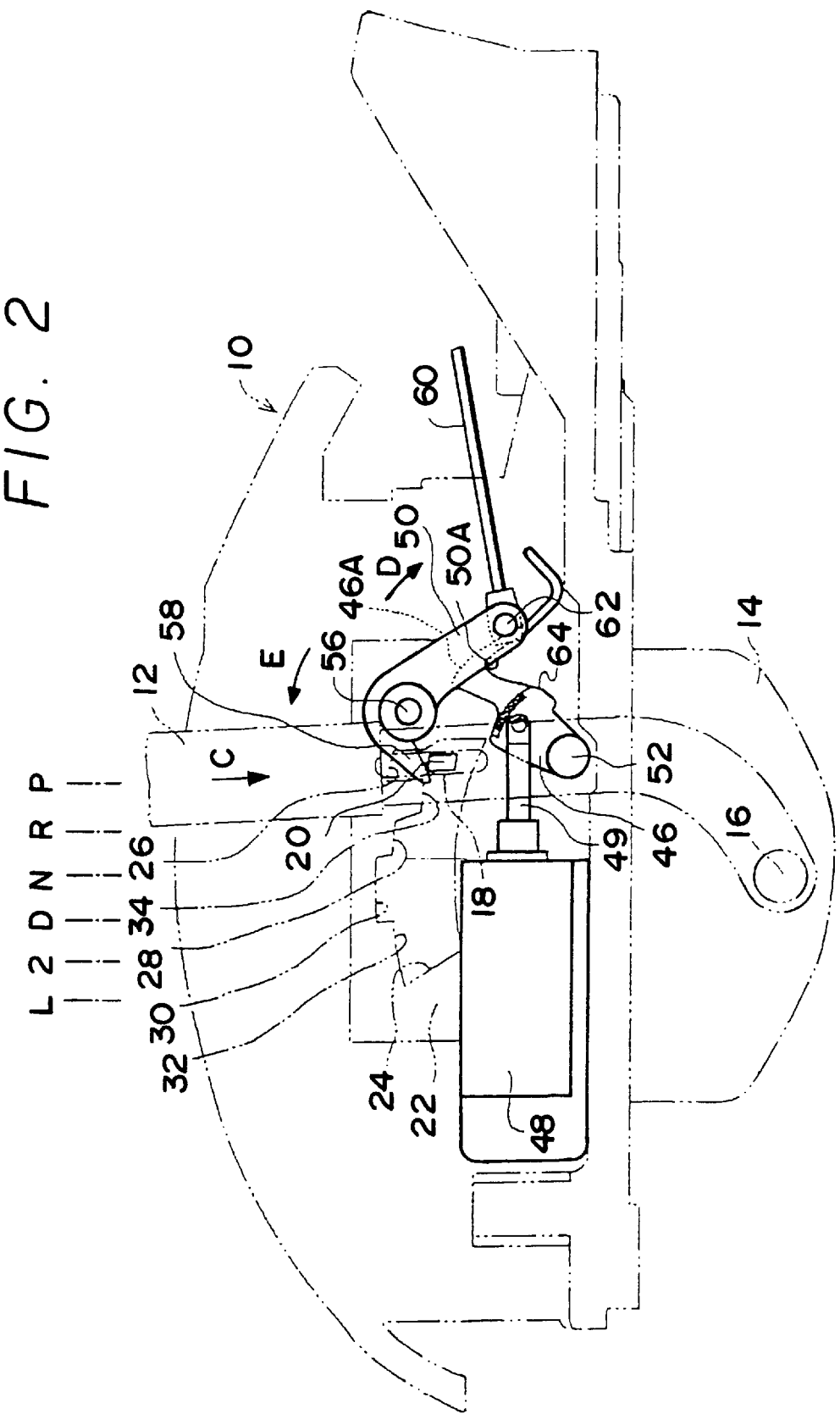
FIG. 2 is a schematic side view which shows a state in which a shift lever is moving from a P range position to another range position in the structure of the main portion of the shift lever device relating to the present embodiment.

FIGS. 1 and 2 show the structure of a main portion of a shift lever device relating to a present embodiment.

In an illustrated shift lever device 10, the proximal end portion of a shift lever 12 is axially supported rotatably at a supporting bracket 14 of the shift lever device 10 by an axial bolt 16.

A slide hole 18, which is a long hole along the axial direction of the shift lever 12, is punched at an axially intermediate portion of the shift lever 12. A grooved pin 20, which is an interlocking member having a rectangular cross-sectional configuration, penetrates through this slide hole 18. The grooved pin 20 is attached so as to move within the slide hole 18 from the distal end side to the proximal end side (the lower side in FIG. 1) of the shift lever 12 by a pressing operation of an unillustrated knob button which is at the distal end side of the shift lever 12. This grooved pin 20 is urged by an unillustrated spring so as to move within the slide hole 18 toward the distal end side of the shift lever 12.

This shift lever 12 is connected to an unillustrated automatic transmission for a vehicle via a rod, a cable, or the like and is structured so that the automatic transmission can be shifted to a necessary position corresponding to a position in which this shift lever 12 is rotated around the axial bolt 16.

At a position which is adjacent to this shift lever 12 and corresponds to the grooved pin 20, a detent plate 22, which is a detent member, is disposed in the inclining direction of the shift lever 12. An opened detent portion 24 is provided at this detent plate 22. The peripheral portion of this detent portion 24 at the distal end side of the shift lever 12 is provided with a concave portion 26 for a P(parking) range, an edge portion 28 for an R(reverse) range, an edge portion 30 for N(neutral) and D(drive) ranges, and an edge portion 32 for 2(second) and L(low) ranges.

When the shift lever 12 is disposed at the P range position shown in FIG. 1, the grooved pin 20 is disposed within the concave portion 26 for the P range, which is the first position, and is restricted to move to the R range position unless the grooved pin 20 is removed from the first position to the second position. Further, when the shift lever 12 is disposed at the R range position, the grooved pin 20 is disposed in the region of the edge portion 28 for the R range. Similarly, when the shift lever 12 is disposed at the N and D range position, the grooved pin 20 is disposed in the region of the edge portion 30 for N and D ranges, and when the shift lever 12 is disposed at the 2 and L range position, the grooved pin 20 is disposed at the edge portion 32 for 2 and L ranges.

Figure 3:
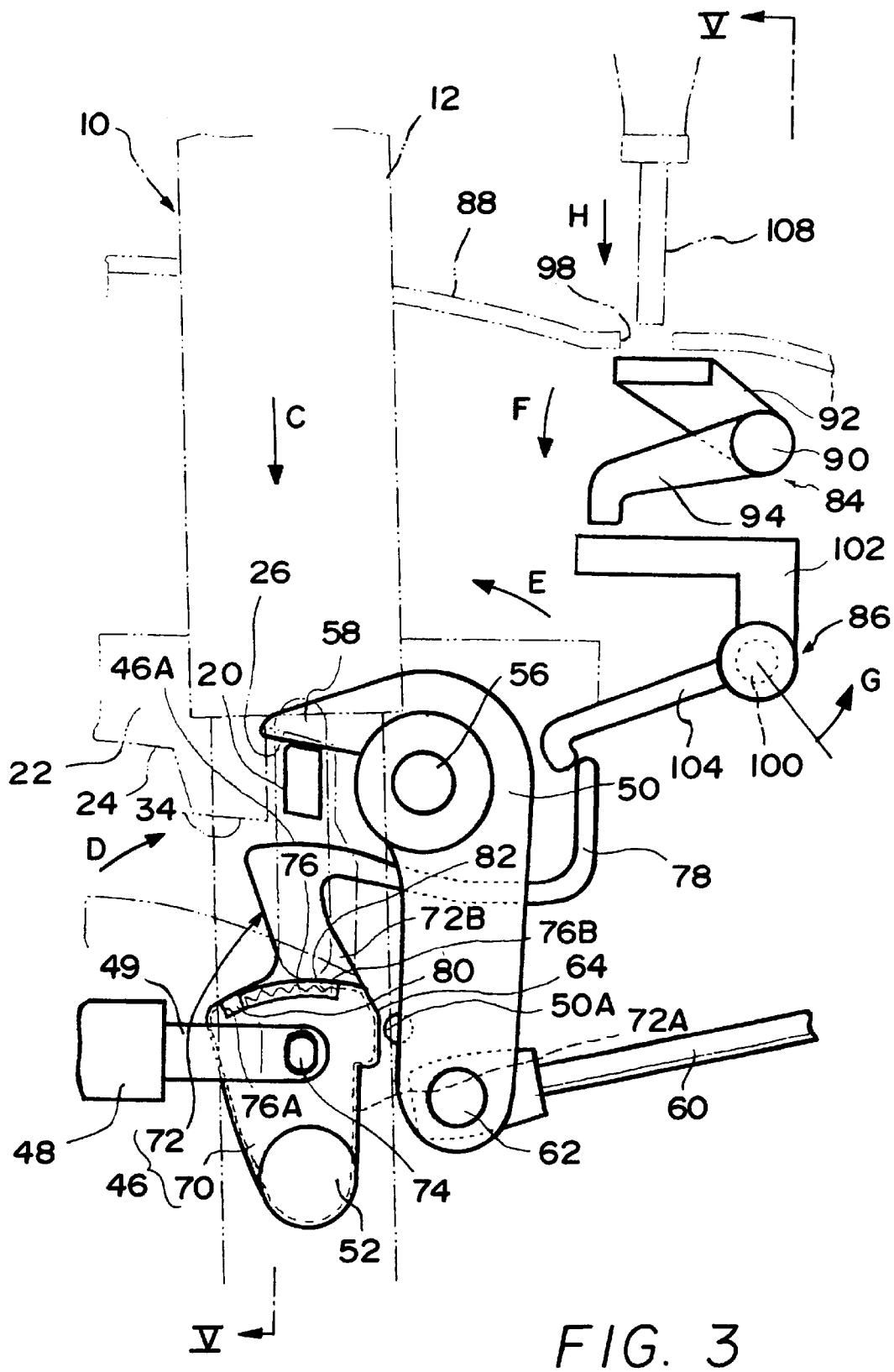
FIG. 3 is a schematic side view which shows an extracted shift lock mechanism and a forcibly releasing mechanism portion thereof in a shift-locked state of the shift lever device relating to the present embodiment.
Figure 4:
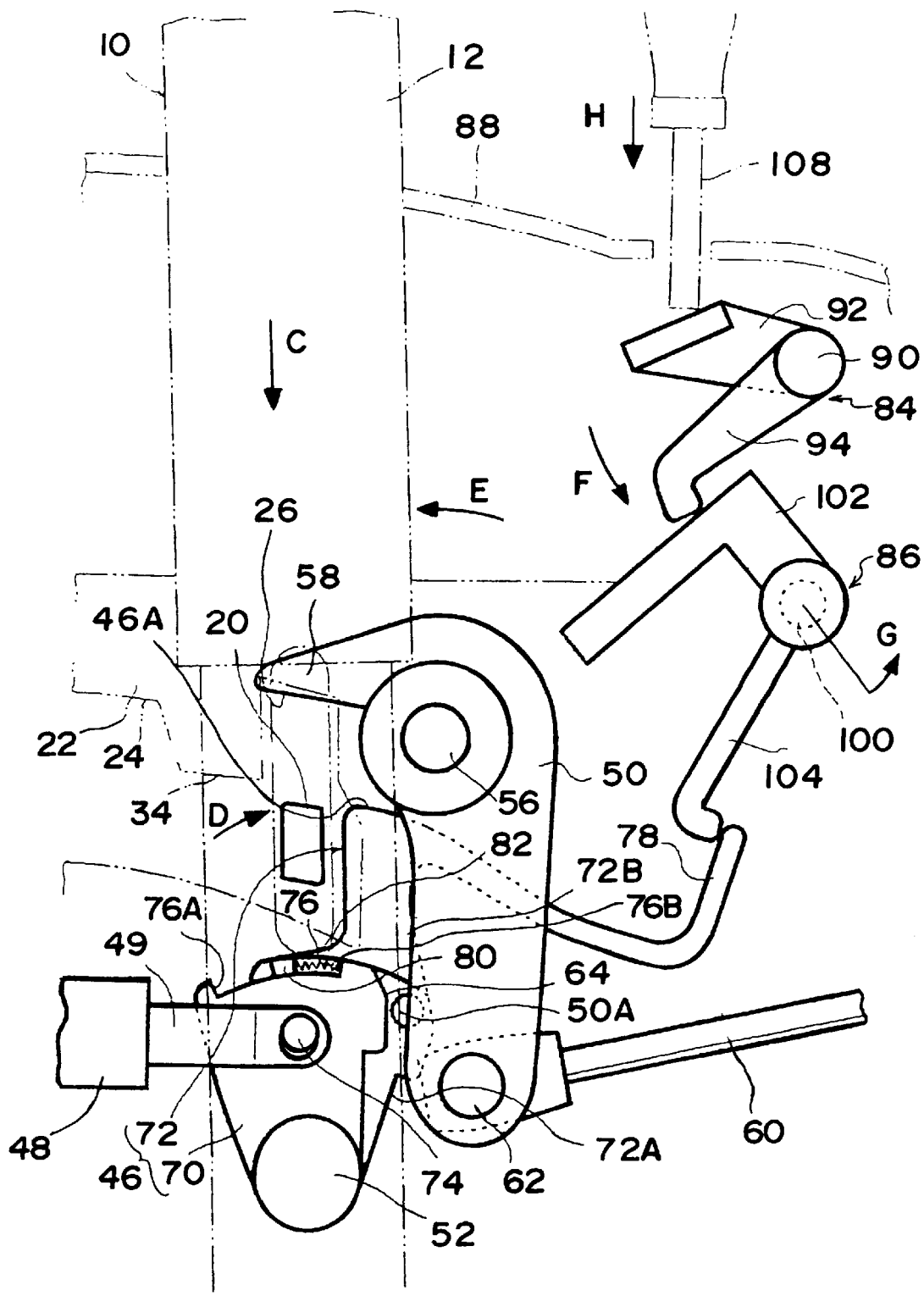
FIG. 4 is a schematic side view which shows the extracted shift-lock mechanism and the forcibly releasing mechanism portion thereof of the shift lever device relating to the present embodiment in a state in which a shift-lock releasing operation is effected and the shift lever is moving from the P range position to the other range position.
Figure 5:
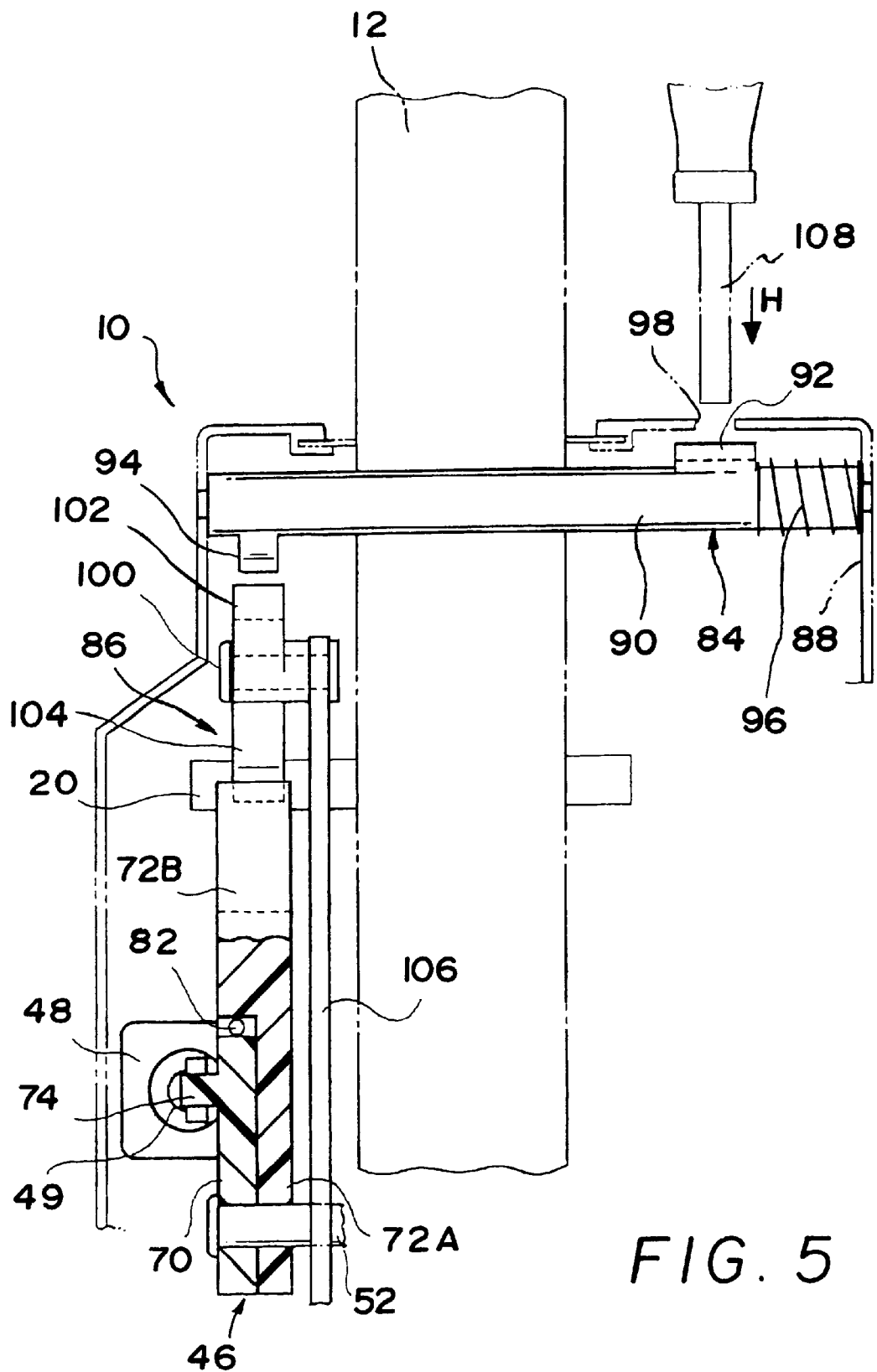
FIG. 5 is a schematic cross-sectional view of a main portion taken along line V—V in FIG. 3.

As shown in FIGS. 1 and 2, a shift lock plate 46 and an actuator 48 for a shift lock mechanism and a cam plate 50 for a key interlock mechanism are attached to this shift lever device 10. As shown in FIGS. 3 through 5 as well, this shift lock plate 46 forms one member by combining an actuator connecting member 70 and a restricting member 72 so as to be relatively rotatable. The proximal end portion of the shift lock plate 46 is axially attached to a bracket 106 of the shift lever device 10 by an axial pin 52 and is disposed adjacent to the detent plate 22.

This actuator connecting member 70 is formed as a small plate-shaped member. An axial pin 74 is provided at a side surface intermediate portion of the actuator connecting member 70 which is a predetermined distance away from the axially supporting portion of the axial pin 52. The axial pin 74 is loosely inserted through a long hole provided at the distal end portion of a rod 49 of the actuator 48, such that the axial pin 74 interlocks with the extending/retracting operation of this rod 49 and rotates in the direction of arrow D or the opposite direction thereof. Moreover, an arc groove-shaped accommodating groove 76 for forming connecting means is formed at an arc-shaped free end portion of the actuator connecting member 70 at the side opposite the proximal end portion thereof.

The restricting member 72 combined with this actuator connecting member 70 is provided with a proximal end plate portion 72A, which is provided on the side which is axially attached by the axial pin 52, a restricting portion 72B, which extends from the distal end plate portion 72A to the free end side, and an arm portion 78 for operation, which further extends from the free end.

This proximal end plate portion 72A is formed substantially in the same shape as that of the actuator connecting member 70. Further, at the proximal end plate portion 72A, a cubic projecting portion 80, which is a portion of the connecting means, is provided as an engaging member at a position which is adjacent to one end portion 76A of the accommodating groove 76 of the actuator connecting member 70 at the actuator 48 side. Moreover, a compression coil spring 82, which is a portion of the connecting means and serves as a spring, is disposed between the projecting portion 80 and another end portion 76B of the accommodating groove 76. The compression coil spring 82 urges so as to return to a state shown in FIG. 3 in which the protruding portion 80 abuts the one end portion 76A, and the actuator connecting member 70 and the proximal end plate portion 72A, which are relatively rotatable, match and superpose. Needless to say, the connecting means may have another structure.

The substantially rectangular plate-shaped restricting portion 72B protrudes from the proximal end plate portion 72A at the end portion 76B side of the accommodating groove of the actuator connecting member 70. As shown in FIG. 5, the restricting portion 72B is formed so that the thickness thereof increases from the proximal end plate portion 72A to the actuator connecting member 70.

As shown in FIG. 3, the shift lock plate 46 is formed such that, at a parking shift lock position, an arc-shaped end edge portion 46A provided at the distal end of the restricting portion 72B closes an exit opening of the concave portion 26 for a P range in the detent plate 22 and that the grooved pin 20 cannot come out from the concave portion 26 for a P range and move to another range position.

Further, since the shift lock plate 46 rotates in the direction of arrow D in FIG. 1 to a state shown in FIG. 2, the end edge portion 46A is removed from the exit opening of the concave portion 26 for a P range, and the grooved pin 20 within the concave portion 26 for a P range moves from the exit opening to the second position, goes beyond a distal end portion 34 for restriction, and can move to the other range edge portions 28, 30, and 32 sides of the detent portion 24.

As shown in FIGS. 3 through 5, as a manual operation mechanism for forcibly releasing the shift lock, a first operating member 84 and a second operating member 86 are attached to the main body of the shift lever device 10. In this first operating member 84, an operation arm portion 92 having the configuration of a small protruding piece protrudes from the outer periphery of an axial rod 90 in the radial direction at a predetermined position of the axial rod 90 which is near the side portion opposite the side portion at which the shift lock plate 46 is provided. The ends of the axial rod 90 are axially supported by the transverse direction side portions of a housing 88 of the shift lever device 10. Also, an interlocking arm portion 94 having the configuration of a small protruding piece protrudes at a position of the axial rod 90 at the shift lock plate 46 side. Further, as shown in FIG. 5, in the first operating member 84, a torsion coil spring 96 is attached to the end portion of the axial rod 90 at the operation arm portion 92 side, and this first operating member 84 is rotated in the direction of the arrow F from the state shown in FIG. 3 against the urging force of the torsion coil spring 96. Thereafter, when the first operating member 84 is released, the first operating member 84 abuts an unillustrated stopper due to the urging force of this torsion coil spring 96. The first operating member 84 is rotated so as to return to the position shown in FIG. 3 and then stops.

Moreover, the free end portion of the operation arm portion 92 of the first operating member 84 is disposed directly below a through-hole 98 which is a permeation hole punched at the housing 88.

As shown in FIGS. 3 through 5, in the second operating member 86, an arm portion 102 to be moved and a functioning arm portion 104 protrude from the outer periphery of an axial portion 100 of the second operating member 86 in two predetermined directions which are different radial directions. This axial portion 100 is supported and received by the bracket 106 and is rotated in the direction of arrow G from the state shown in FIG. 3 against the urging force of an unillustrated torsion coil spring. Thereafter, when the axial portion 100 is released, the axial portion 100 abuts an unillustrated stopper by the urging force of this spring and returns to the state shown in FIG. 3.

This arm portion 102 to be moved is formed hook-shaped when seen from the side, and the free end portion thereof is disposed directly below the interlocking arm portion 94 of the first operating member 84. When the interlocking arm portion 94 rotates in the direction of arrow F in FIG. 3, the arm portion 102 to be moved is pressed by the interlocking arm portion 94 and rotates the second operating member 86 in the direction of arrow G.

Further, the functioning arm portion 104 forms the configuration of a small protruding piece whose distal end is bent in a small hook shape, and the free end portion thereof is formed so as to abut the distal end portion of the arm portion 78 for operation of the restricting member 72. When the functioning arm portion rotates in the direction of arrow G in FIG. 3, the arm portion 78 for operation is pressed by the functioning arm portion 104 and the restricting member 72, which is integral with the arm portion 78 for operation, is rotated in the direction of arrow D.

In the actuator 48 of the shift lock mechanism for operating the shift lock plate 46 shown in FIGS. 1 and 2, when electricity does not flow to the solenoid, the rod 49 extends from the main body by the urging force of an unillustrated compression spring and, when the solenoid is energized, the rod 49 is withdrawn into the main body as shown in FIG. 1 against the urging force of an unillustrated compression spring. As mentioned above, the distal end portion of the rod 49 is connected to an intermediate portion of the actuator connecting member 70. When the brake pedal is depressed, electricity does not flow to the actuator 48.

As shown in FIGS. 1 and 2, the cam plate 50 for a key interlock attached to this shift lever device 10 is disposed at a position adjacent to a side (on the right-hand side in FIGS. 1 and 2) in the direction in which the cam plate 50 rotates so as to be removed from the exit opening of the concave portion 26 for a P range of the shift lock plate 46. This cam plate 50 is substantially crescent-shaped and a region which is near one end portion thereof (region which is near the upper side in FIGS. 1 and 2) is axially attached to the bracket 106 of the shift lever device 10 by an axial pin 56. Further, an unillustrated torsion coil spring is attached to this axial pin 56 portion and the cam plate 50 is urged so as to rotate in the direction of arrow E in FIG. 1.

Moreover, a connecting portion 58 having the configuration of a small protruding piece is formed integrally with the end portion of the cam plate 50 at the axial pin 56 side.

As shown in FIGS. 1 and 2, when the grooved pin 20 is provided within the concave portion 26 for a P range of the detent portion 24, this connecting portion 58 moves to the state shown in FIG. 2 from the state shown in FIG. 1 in a state in which the connecting portion 58 abuts the grooved pin 20 so as to follow the removal operation of the grooved pin 20 from the concave portion 26. Because the urging force of the spring, which urges the grooved pin 20 attached to the inside of the shift lever 12 to move to the distal end side of the shift lever 12, is sufficiently strong, when the unillustrated knob button of the shift lever is released in the state shown in FIG. 2, the urging force of this spring exceeds the urging force of the spring attached to the axial pin 56 portion of the cam plate 50 and the cam plate 50 is rotated in the direction opposite the direction of arrow E from the state shown in FIG. 2 to the state shown in FIG. 1.

One end portion of a key lock cable 60 is axially attached by the axial pin 62 to the end portion of the cam plate 50 at the side opposite the connecting portion 58. The other end portion of this key lock cable 60 is connected to an unillustrated key interlock mechanism portion.

Further, a protruding portion 50A is formed in a predetermined region near the axial pin 62 of the cam plate 50. The protruding portion 50A protrudes in a column shape from the side plane surface of the cam plate 50 which opposes the shift lock plate 46 and slidingly contacts a guide surface 64 of the actuator connecting member 70 without abutting the proximal end plate portion 72A of the restricting member 72. When the cam plate 50 slightly rotates in the direction of arrow E, this protruding portion 50A slidingly contacts the gently-curved guide surface 64 of the shift lock plate 46 at the actuator connecting member 70 side and the operation of the shift lock plate 46 follows that of the cam plate 50.

Next, the shift lock mechanism attached to the shift lever device and the key interlock mechanism will be explained using FIGS. 1 and 2. In this key interlock mechanism, when a key is not inserted into an unillustrated key cylinder or when the key is inserted but is placed at the OFF position, and is not rotated to the ON position of an ACC, an engine, or the like, the key lock cable 60 is prevented from moving in the direction of arrow K, the rotation of the cam plate 50 in the direction of arrow E is prevented and the state shown in FIG. 1 is maintained.

Namely, in the state shown in FIG. 1, electricity does not flow to the solenoid of the actuator 48 in the shift lock mechanism, and even if the shift lock plate 46 is urged to rotate in the direction of arrow D by the unillustrated compression spring, since the portion of the guide surface 64 of the actuator connecting member 70 of the shift lock plate 46 is stopped by abutting the protruding portion 50A of the cam plate 50, the state shown in FIG. 1 is maintained. Accordingly, even if the unillustrated knob button of the shift lever 12 is pressed, the grooved pin 20 is stopped at the end edge portion 46A of the restricting member 72 of the shift lock plate 46 which is disposed at the exit of the concave portion 26 for a P range and cannot be removed from the concave portion 26 for a P range. Thus, the shift lever 12 is held at the P-range position.

Further, when the key is inserted into the key cylinder and is rotated from the OFF position to the ON position of the ACC, the engine, or the like, the key lock cable 60 can be moved in the direction of arrow K.

Moreover, when the key is rotated so as to turn on the engine and the shift lever 12 is disposed at the P range position, in a state in which the brake is not depressed, electricity flows to the solenoid of the actuator 48 and the shift lock plate 46 is disposed at a position which closes the exit of the concave portion 26 for a P range shown in FIG. 1. Further, the grooved pin 20 cannot be removed from the concave portion 26 for a P range and the shift lever 12 cannot be shifted to a position other than the P range position, such as the D range position or the like. When the brake is depressed in the aforementioned state, electricity does not flow to the solenoid of the actuator 48, the shift lock plate 46 receives urging force of the spring of the actuator 48 so as to rotate in the direction of arrow D, and this urging force is transmitted to the cam plate 50 via the protruding portion 50A. At this time, the urging force of the shift lock plate 46 in the direction of arrow D and the urging force thereof in the direction of arrow E which rotates the cam plate 50 are applied to the cam plate 50. The combined forces are transmitted to the grooved pin 20 which abuts the connecting portion 58.

Further, force which urges the grooved pin 20 towards the distal end side of the shift lever 12 (force in the direction opposite the direction of arrow C) is set sufficiently larger than the combined forces of the urging forces applied to the shift lock plate 46 and the cam plate 50. Thus, unless the knob button is operated, the state shown in FIG. 1 is maintained. When the knob button is pressed in this state, the grooved pin 20 is pressed downwardly in the direction of arrow C. In association with the movement of this grooved pin 20, the cam plate 50 rotates in the direction of arrow E while abutting the connecting portion 58 and the protruding portion 50A, which prevents the rotation of the actuator connecting member 70 of the shift lock plate 46 in the direction of arrow D, moves in the direction of arrow E. Consequently, the actuator connecting member 70 of the shift lock plate 46 rotates in the direction of arrow D while the guide surface 64 slidingly contacts the protruding portion 50A. Accordingly, the restricting member 72 also rotates in the same direction and rotates the end edge portion 46A to the position in FIG. 2 which is separate from the exit of the concave portion 26 for a P range.

In the state shown in FIG. 2, since the grooved pin 20 is removed from the concave portion 26 for a P range, the shift change operation which rotates and moves the shift lever 12 to the other range position can be effected.

Moreover, in the state shown in FIG. 2, the key lock cable 60 is moved by the rotation of the cam plate 50 and the key interlock mechanism is held in a state in which the key cannot be removed.

When the shift lever 12 is returned to the P range position from the shifting operation position other than the P range, the shift lever 12 is returned to the P range position shown in FIG. 2 while pressing the knob button and then the knob button is released. The grooved pin 20 operates opposite the aforementioned case due to the urging force of the spring relating to this knob button and returns to the state shown in FIG. 1. At this time, the protruding portion 50A moves in the direction opposite the direction of arrow E and operates using the guide surface 64 so that the actuator connecting member 70 moves in the direction opposite the direction of arrow D.

Next, description will be given of the action and operation of the forcible shift lock releasing mechanism in the shift lever device relating to the aforementioned present embodiment. In the parking state of the shift lever device shown in FIG. 1, when the shift lever 12 is shifted from the P range position to the other range position of R, N, D, 2, L without effecting a key operation, a braking operation, or the like, as shown in FIG. 3, the distal end portion of a tool 108 such as a screw driver or the like is inserted through the through-hole 98 of the housing 88 in the direction of arrow H and the operation arm portion 92 is pressed.

The first operating member 84 rotates in the direction of arrow F, and since the interlocking arm portion 94 which rotates according to this rotation presses the arm portion 102 to be moved, the second operating member 86 rotates in the direction of arrow G. At this rotational movement, the functioning arm portion 104 of the second operating member 86, which is rotating in the direction of arrow G, rotates the restricting member 72 in the direction of arrow D by pressing the arm portion 78 for operation, and the first operating member 84, the second operating member 86, and the restricting member 72 return to the state shown in FIG. 4.

In this state, the end edge portion 46A of the restricting member 72 is disposed at a position which is separate from the exit of the concave portion 26 for a P range. Thus, by pressing the knob button of the shift lever 12 in this state, the grooved pin 20 is lowered to the position which is outside of the concave portion 26 for a P range and the shift lever 12 is moved to any one of the shift range positions R, N, D, 2, and L. In this way, even if there is no key or if the key lock cable 60, the cam plate 50, the shift lock plate 46, or the actuator 48 does not move, the shift lock is released and the shift lever 12 can be shifted.

Further, when the shift lever 12 is placed at a position other than the P range position, the shift lever 12 may be returned to the P range position in order to return to the P range. When the shift lever 12 is operated in this way, the grooved pin 20 abuts the restricting member 72 and rotates this against the urging force of the spring 82 to the state shown in FIG. 4. Thereafter, when the knob button of the shift lever 12 is released, the grooved pin 20 enters the concave portion 26 for a P range by the urging force of the spring as shown in FIG. 3 and separates from the restricting member 72. The restricting member 72, from which the grooved pin 20 is separated, is rotated in the direction opposite the direction of arrow D and returns to the state shown in FIG. 3.

In the above-described embodiment, the manual operation mechanism is formed by two parts. However, the manual operation mechanism may be formed by a single part, into which these parts are integrated, or by three or more parts.

What is claimed is:

1. A shift lever device comprising:

a shift lever for a gear changing operation of a transmission of a vehicle;

an interlocking member which is provided at said shift lever and is attached so as to move from a first position to a second position by the operation of a knob button;

a detent member provided with a detent portion which, when said shift lever is shifted, abuts said interlocking member at the first position and restricts the shifting operation if said shift lever is shifted from the parking range position to another range position, and said detent member separates from said interlocking member at the second position so that the shifting operation is effected freely;

a restricting member which, when said shift lever is disposed at the parking range position, is pivotally attached so as to be able to move between a shiftlock released state which allows said interlocking member to move and a shift-locked state which does not allow said interlocking member to move from the first position to the second position;

a manual operation mechanism which manually effects an operation of moving said restricting member from the shift-locked state to a shift-lock released state; and an actuator connecting member which is pivotally attached so as to move integrally with said restricting member due to the operation of an actuator, wherein when said restricting member is placed in a shift-locked state, said restricting member is moved relative to said actuator connecting member by operating said manual operation mechanism and can be moved to the shift-lock released state.

2. A shift lever device according to claim 1, wherein said manual operation mechanism is formed by a plurality of parts.

3. A shift lever device according to claim 1, wherein said actuator connecting member is substantially fan-shaped.

4. A shift lever device according to claim 1, wherein said restricting member rotates coaxially with said actuator connecting member.

5. A shift lever device according to claim 1, wherein said actuator connecting member is connected with an actuator rod of the actuator.

6. A shift lever device, comprising:

a shift lever for a gear changing operation of a transmission of a vehicle;

an interlocking member which is provided at said shift lever and is attached so as to be moved by the operation of a knob button;

a detent member provided with a detent portion which, when said shift lever is shifted, abuts said interlocking member and restricts the shifting operation if said shift lever is at least shifted from the parking range position to another range position;

a restricting member which is attached so as to be able to move between a shift-lock released state, in which said restricting member is disposed separately from an opening portion of the detent portion so that said interlocking member at the parking range position can be removed from said detent portion, and a shift-locked state, in which said restricting member is disposed so as to close the opening portion of the detent portion;

a manual operation mechanism which manually moves said restricting member from the shift-locked state to the shift-lock released state;

an actuator connecting member which is attached so as to move integrally with said restricting member due to the operation of an actuator;

an engaging member which is engaged so that said actuator connecting member and said restricting member are integrally operated by the actuator and moved from the shift-locked state to the shift-lock released state; and a spring which is installed between said restricting member and said actuator connecting member and urges so as to operate said restricting member and said actuator connecting member integrally, and in the shift-locked state, said spring being attached so as to be elastically deformed when said restricting member is moved to the shift-lock released state by said manual operation mechanism.

7. A shift lever device according to claim 6, wherein said manual operation mechanism is formed by a plurality of parts.

8. A shift lever device according to claim 6, wherein said spring is a compression coil spring.

9. A shift lever device according to claim 6, wherein said actuator connecting member is substantially fan-shaped.

10. A shift lever device according to claim 6, wherein said restricting member rotates coaxially with said actuator connecting member.

11. A shift lever device, comprising:

a shift lever for a gear changing operation of a transmission of a vehicle;

an interlocking member which is provided at said shift lever and is attached so as to move from a first position to a second position by the operation of a knob button;

a detent member provided with a detent portion which, when said shift lever is shifted, abuts said interlocking member at the first position and restricts the shifting operation if said shift lever is at least shifted from the parking range position to another range position;

a restricting member which is attached so as to be able to move between a shift-lock released state, which allows the movement of said interlocking member at the first position, i.e., the parking range position to the second position, and a shift-locked state which prevents the movement of said interlocking member at the first position to the second position;

a manual operation mechanism which manually moves said restricting member from the shift-locked state to the shift-lock released state;

an actuator connecting member which is moved due to the operation of an actuator;

an engaging means which is disposed between said actuator connecting member and said restricting member, said engaging means transmitting the movement of said actuator connecting member operated by the actuator to the restricting member and moving said restricting member to the shift-lock released state, and said engaging means separating said restricting member in a shift-locked state from said actuator connecting member so that said restricting member can be moved to the shift-lock released state by said manual operation mechanism; and a spring which urges said restricting member to the shift-locked state.

12. A shift lever device according to claim 11, wherein said manual operation mechanism is formed by a plurality of parts.

13. A shift lever device according to claim 11, wherein said spring is a compression coil spring.

14. A shift lever device according to claim 11, wherein said actuator connecting member is substantially fan-shaped.

15. A shift lever device according to claim 11, wherein said restricting member rotates coaxially with said actuator connecting member.

16. A shift lever device, comprising:

a shift lever for a gear changing operation of a transmission of a vehicle;

an interlocking member which is provided at said shift lever and is attached so as to move from a first position to a second position by the operation of a knob button;

a detent member provided with a detent portion which, when said shift lever is shifted, abuts said interlocking member at the first position and restricts the shifting operation if said shift lever is shifted from the parking range position to another range position, and said detent member separates from said interlocking member at the second position so that the shifting operation is effected freely;

a restricting member which, when said shift lever is disposed at the parking range position, is attached so as to be able to move between a shift-lock released state which allows said interlocking member to move and a shift-locked state which does not allow said interlocking member to move from the first position to the second position;

a manual operation mechanism which manually effects an operation of moving said restricting member from the shift-locked state to the shift-lock released state; and an actuator connecting member which is attached so as to move integrally with said restricting member due to the operation of an actuator, wherein when said restricting member is placed in a shift-locked state, said restricting member is moved relative to said actuator connecting member by operating said manual operation mechanism and can be moved to the shift-lock released state, and wherein said restricting member rotates coaxially with said actuator connecting member.

* * * * *

UNITED STATES PATENT AND TRADEMARK OFFICE
CERTIFICATE OF CORRECTION

PATENT NO. : 6,109,414
DATED : 8/29/00
INVENTOR(S) : Shigetoshi Tomida et al.

It is certified that error appears in the above-indentified patent and that said Letters Patent is hereby corrected as shown below:

On the title page, item [73] Assignee designation is:

KABUSHIKI KAISHA TOKAI-RIKA-DENKI SEISAKUSHO and NISSAN MOTOR CO., LTD.

Signed and Sealed this

Twentieth Day of March, 2001

Attest:

NICHOLAS P. GODICI

Attesting Officer

*Acting Director of the United States Patent and Trademark Office*